United States Patent
Digate et al.

(10) Patent No.: US 8,831,647 B2
(45) Date of Patent: Sep. 9, 2014

(54) PRESENCE-ENABLED MOBILE ACCESS

(75) Inventors: Charles J. Digate, Winchester, MA (US); Christopher F. Herot, Newton Highlands, MA (US)

(73) Assignee: Devereux Research AB LLC, Wilmington, DE (US)

( * ) Notice: Subject to any disclaimer, the term of this patent is extended or adjusted under 35 U.S.C. 154(b) by 1579 days.

(21) Appl. No.: 11/406,064

(22) Filed: Apr. 18, 2006

(65) Prior Publication Data

US 2006/0234735 A1   Oct. 19, 2006

Related U.S. Application Data

(60) Provisional application No. 60/672,756, filed on Apr. 19, 2005.

(51) Int. Cl.
*H04W 4/00* (2009.01)

(52) U.S. Cl.
USPC ............ 455/466; 709/204; 709/205; 709/206; 709/207

(58) Field of Classification Search
USPC ............. 455/466; 705/26; 709/204, 205, 227, 709/206
See application file for complete search history.

(56) References Cited

U.S. PATENT DOCUMENTS

| | | | |
|---|---|---|---|
| 6,339,790 B1 * | 1/2002 | Inoue | 709/224 |
| 6,378,069 B1 | 4/2002 | Sandler et al. | 713/153 |
| 6,549,937 B1 | 4/2003 | Auerbach et al. | |
| 6,721,410 B1 | 4/2004 | Will | |
| 6,996,409 B2 | 2/2006 | Gopinath et al. | 455/466 |
| 7,020,460 B1 | 3/2006 | Sherman et al. | 455/415 |
| 7,213,050 B1 * | 5/2007 | Shaffer et al. | 709/204 |
| 7,263,545 B2 | 8/2007 | Digate et al. | |
| 7,428,580 B2 * | 9/2008 | Hullfish et al. | 709/207 |
| 7,433,921 B2 * | 10/2008 | Ludwig et al. | 709/204 |
| 7,444,373 B2 * | 10/2008 | Ludwig et al. | 709/204 |
| 2002/0078153 A1 * | 6/2002 | Chung et al. | 709/204 |

(Continued)

FOREIGN PATENT DOCUMENTS

| | | |
|---|---|---|
| EP | 1545087 | 6/2005 |
| WO | WO2006060744 | 6/2006 |

OTHER PUBLICATIONS

Extended European Search Report dated Aug. 13, 2010 for International Application No. PCT/US2007/010532.
Office Action dated Jul. 12, 2010 for U.S. Appl. No. 12/463,200.

(Continued)

*Primary Examiner* — Liton Miah
(74) *Attorney, Agent, or Firm* — Brundidge & Stanger, P.C.

(57) ABSTRACT

A real-time communications system that is capable of convening an on-line meeting or teleconference involving text, audio, video, and/or data between multiple users of mobile and non-mobile devices. A mobile telephone is operative to receive an invitation to join an on-line meeting with at least one user of another mobile or non-mobile device. If the mobile telephone network can provide an indication of whether the mobile telephone is powered-on and within the coverage area of the mobile telephone network, a real-time messaging server employs this information to determine the on-line presence of the mobile telephone user before transmitting the meeting invitation. Otherwise, the real-time messaging server assumes that the mobile telephone user is present and on-line. The mobile telephone user may indicate his or her desire to join the on-line meeting by transmitting an SMS message to the real-time messaging server in response to the meeting invitation, after which the real-time messaging system may convene the on-line meeting between the multiple users.

20 Claims, 7 Drawing Sheets

(56) References Cited

U.S. PATENT DOCUMENTS

| | | |
|---|---|---|
| 2002/0083127 A1 | 6/2002 | Agrawal |
| 2002/0165000 A1 | 11/2002 | Fok |
| 2003/0018718 A1* | 1/2003 | Maehiro ................ 709/205 |
| 2003/0083079 A1* | 5/2003 | Clark et al. ............ 455/466 |
| 2003/0105820 A1* | 6/2003 | Haims et al. .......... 709/205 |
| 2003/0191676 A1 | 10/2003 | Templeton |
| 2003/0217142 A1* | 11/2003 | Bobde et al. .......... 709/224 |
| 2003/0229670 A1 | 12/2003 | Beyda |
| 2003/0231647 A1 | 12/2003 | Petrovykh |
| 2004/0122901 A1* | 6/2004 | Sylvain ................. 709/206 |
| 2004/0161080 A1 | 8/2004 | Digate et al. |
| 2005/0014490 A1* | 1/2005 | Desai et al. ............ 455/416 |
| 2005/0037787 A1* | 2/2005 | Bachner et al. ........ 455/502 |
| 2005/0233737 A1* | 10/2005 | Lin ........................ 455/416 |
| 2005/0262195 A1* | 11/2005 | Ono et al. .............. 709/203 |
| 2006/0075091 A1* | 4/2006 | Beyda et al. ........... 709/224 |
| 2006/0195363 A1* | 8/2006 | Heron et al. ........... 705/26 |
| 2006/0215630 A1* | 9/2006 | Hwang et al. ......... 370/351 |

OTHER PUBLICATIONS

Office Action dated Aug. 4, 2010 for U.S. Appl. No. 10/367,640.
Restriction Requirement dated Sep. 29, 2010 for U.S. Appl. No. 11/293,035.

* cited by examiner

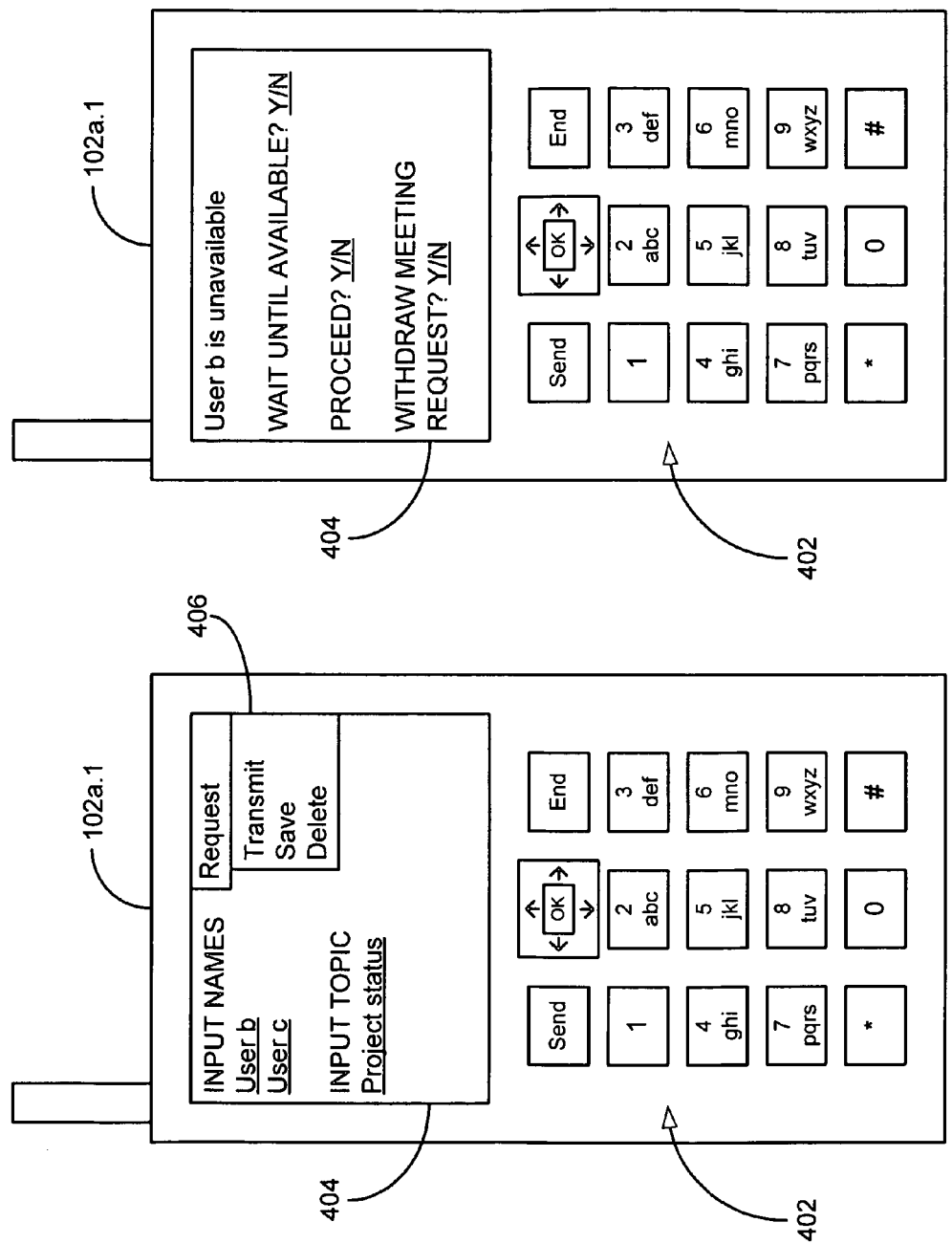

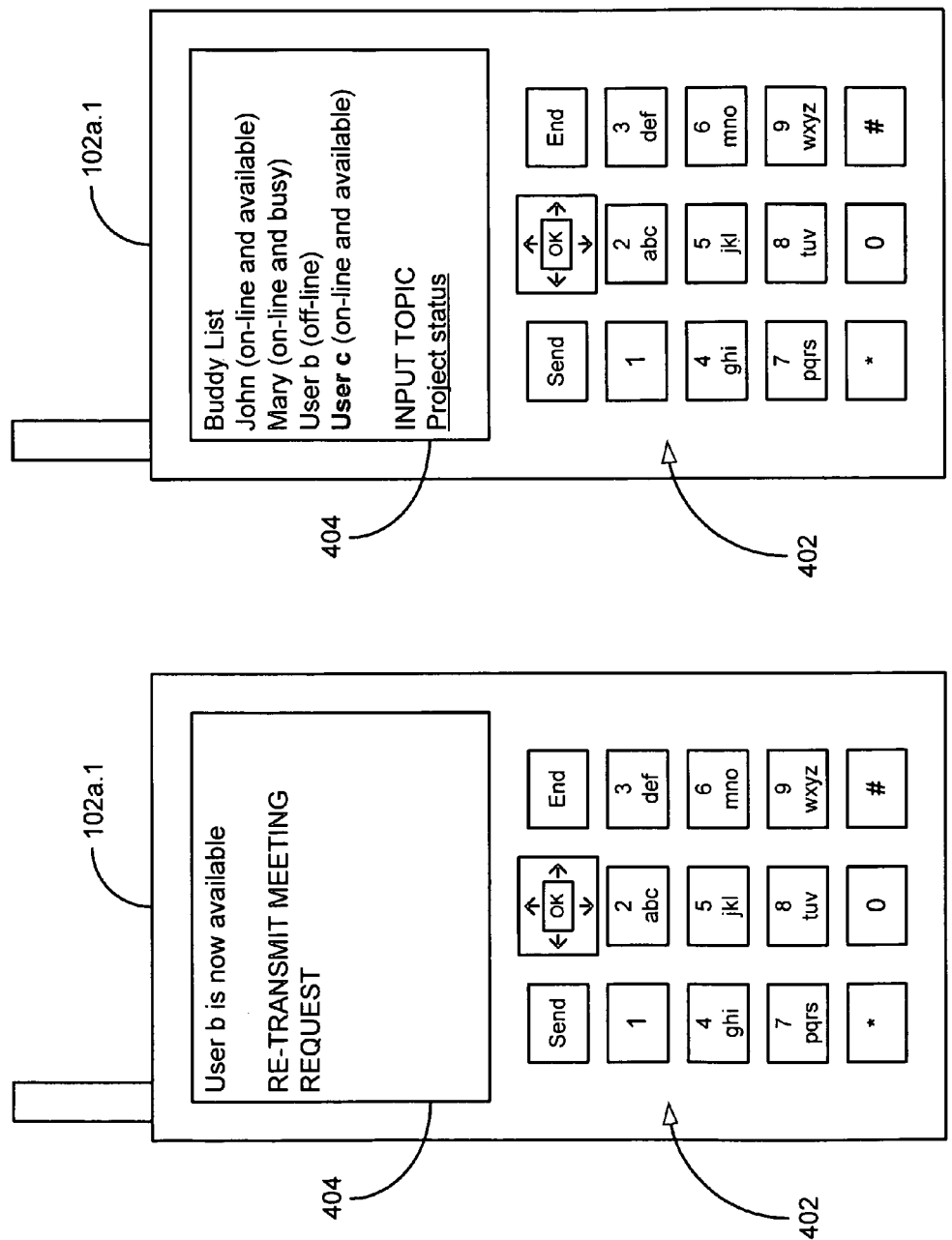

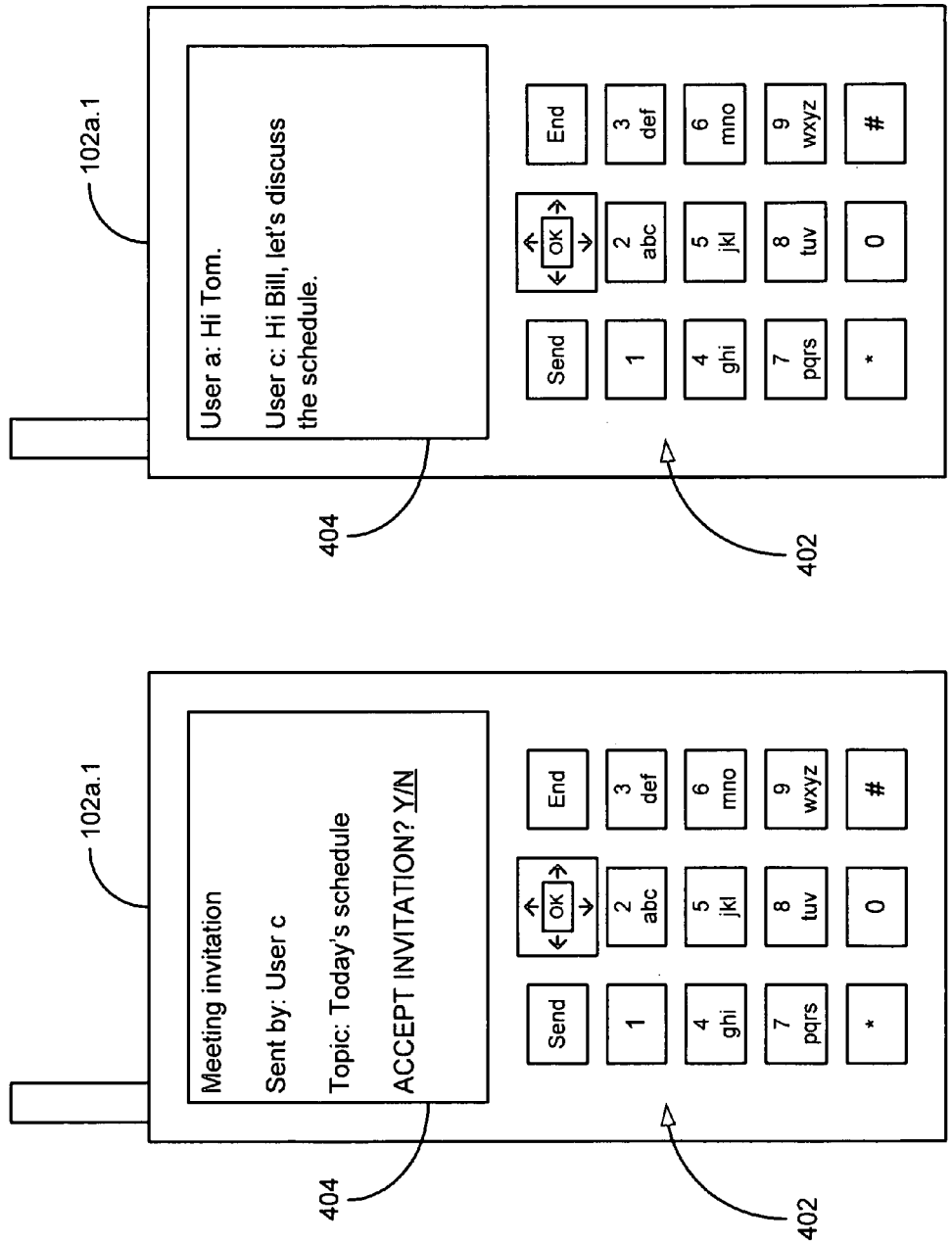

PRESENCE-ENABLED MOBILE ACCESS

CROSS REFERENCE TO RELATED APPLICATIONS

This application claims benefit of U.S. Provisional Patent Application No. 60/672,756 filed Apr. 19, 2005 entitled PRESENCE-ENABLED MOBILE ACCESS.

STATEMENT REGARDING FEDERALLY SPONSORED RESEARCH OR DEVELOPMENT

N/A

BACKGROUND OF THE INVENTION

The present invention relates generally to real-time communications systems, and more specifically to a real-time communications system that employs the on-line presence of a user of a mobile device to allow that user to participate in an on-line meeting or teleconference involving text, audio, video, and/or data with one or more other users of mobile and/or non-mobile devices.

In recent years, real-time communications systems such as instant messaging systems have been increasingly employed to facilitate real-time group activities such as the convening on-line meetings or teleconferences between multiple users. A conventional real-time communications system that provides instant messaging capabilities includes a plurality of client devices communicably coupled to a real-time messaging server computer via at least one communications network such as the Internet. In the conventional instant messaging (IM) system, each user of a client device is generally a subscriber or a registered user of the IM system. In a typical mode of operation, the conventional IM system allows each subscriber to generate and maintain what is commonly known as a "buddy list", which comprises a list of the names of some subset of the other users of the IM system such as friends and/or business associates of the subscriber. The buddy list can be displayed on the client device, along with visual indications of the on-line status and the availability status of each user on the list. The on-line status of a user of the IM system generally corresponds to the on-line presence of that user. For example, if the client device is a personal computer (PC), then the conventional IM system can determine the on-line presence of a user of the PC based on whether the PC (1) is powered-on, (2) is connected to the Internet, and (3) has instant messaging (IM) application software loaded thereon and logged onto the IM system. If the user's PC is on-line, then the user may select an availability status from a pull-down menu displayable on a video monitor of the computer. For example, the user may select an availability status indicating that he or she is currently available, or is busy and does not want to be disturbed. Alternatively, the IM application software may automatically set a state relating to the user's availability. For example, the IM application software may set an "away" state after a specified interval of keyboard inactivity has expired, or may set a "busy" state in response to a specific user action such as being engaged in another IM conversation.

In order for a mobile device such as a mobile telephone to be considered on-line within the conventional IM system, the mobile telephone must be powered-on and within the coverage area of a mobile telephone network. The mobile telephone may also be configured to provide data connectivity, and may have IM application software loaded thereon for directly logging the mobile telephone onto the IM system. In this configuration, the conventional IM system may be capable of determining the on-line presence and availability status of a user of the mobile telephone in substantially the same way it determines the on-line presence and availability status of a user of a personal computer. Such on-line presence and availability information may be employed by a subscriber of the IM system to determine whether an on-line meeting involving one or more users on his or her buddy list can be successfully convened. Based on the on-line presence and availability status of the desired meeting participants, the subscriber may attempt to convene the on-line meeting immediately, or may delay the convening of the on-line meeting until all or at least a certain number of the desired meeting participants are on-line and available.

One drawback of conventional real-time communications systems such as instant messaging systems is that they can be problematic for users of mobile devices, including mobile telephones, personal digital assistants (PDAs), laptop computers, etc. For example, as described above, a mobile telephone must be powered-on and within the coverage area of a mobile telephone network to be considered on-line within the conventional IM system. However, conventional mobile telephone networks typically provide no definitive indication to external systems such as instant messaging systems of whether a mobile telephone is powered-on and within the coverage area of the network, thereby making it difficult at best to determine the on-line presence and availability status of a user of the mobile telephone. This in turn makes it difficult for a user of the instant messaging system to know with any degree of certainty whether or not an on-line meeting or teleconference involving a user of a mobile telephone can be successfully convened.

It would therefore be desirable to have a real-time communications system for convening an on-line meeting or teleconference between multiple users of mobile and/or non-mobile devices. Such a real-time communications system would be capable of convening an on-line meeting based at least in part on the on-line presence and availability status of the respective mobile and non-mobile device users. It would also be desirable to have a real-time communications system that can convene an on-line meeting or teleconference involving text, audio, video, and/or data between multiple users.

BRIEF SUMMARY OF THE INVENTION

In accordance with the present invention, a real-time communications system is provided that is capable of convening an on-line meeting or teleconference involving text, audio, video, and/or data between multiple users of mobile and/or non-mobile devices. The presently disclosed real-time communications system operates to convene such on-line meetings or teleconferences based at least in part on the on-line presence and availability status of the respective users of the mobile and non-mobile devices.

In one embodiment, the real-time communications system includes a plurality of client sub-systems, at least one real-time messaging server computer, at least one presence server computer, at least one database server computer, and at least one communications network. For example, the plurality of client sub-systems may include a mobile client, a PC client, and/or any other suitable mobile or non-mobile client. The real-time communications system is operative to allow the plurality of client sub-systems to communicate with the real-time messaging server over the communications network. For example, on-line presence and meeting request messages originating from the plurality of client sub-systems may be passed to the real-time messaging server, which may perform specified actions for convening an on-line meeting or teleconference between the client sub-systems based on the on-line presence and meeting request messages. On-line presence data contained in the on-line presence messages are stored within the presence server, and data relating to the users of the client sub-systems, user stand-ins, user groups, user preferences and group definitions, and internal and/or external data sources are stored in the database server.

In the disclosed exemplary embodiment, the real-time communications system further includes an instant messaging server computer, and a plurality of communications networks including the public switched telephone network (PSTN) and the Internet. In addition, the plurality of client sub-systems includes at least one mobile device such as a mobile telephone. The real-time communications system is operative to allow the mobile telephone to communicate with the real-time messaging server over the PSTN via a telephone interface, which is configured to maintain a connection to the PSTN for transmitting voice prompts to the mobile telephone, and for receiving voice and/or dual tone multi-frequency (DTMF) inputs from the mobile telephone. The telephone interface is also configured to maintain a connection to at least one short message service center (SMSC) for exchanging short message service (SMS) messages between the mobile telephone and the real-time messaging server. The mobile telephone may also communicate with the instant messaging server directly via a data connection.

In one mode of operation, a user of a mobile telephone employs the real-time communications system to convene an on-line meeting or teleconference with at least one other user of a mobile or non-mobile device. In this mode of operation, several configurations of the mobile telephone are possible. For example, in one configuration, the mobile telephone is operative to exchange voice messages and short message service (SMS) messages with the real-time messaging server, and to exchange SMS messages with the instant messaging server. In the event the user of the mobile telephone wishes to convene an on-line meeting with one or more other users of mobile and/or non-mobile devices, he or she logs onto the instant messaging server by transmitting at least one specified SMS message such as a specified SMS "short code" to the instant messaging server. Next, using an alphanumeric keypad and display included in his or her mobile telephone, the user generates at least one SMS message including the names of the desired meeting participants and an optional indication of the topic of the meeting, and transmits the SMS message to the real-time messaging server, which determines, in conjunction with the instant messaging server, whether the designated meeting participants are on-line and available. In the event the desired meeting participants are on-line and available to participate in the on-line meeting, the real-time messaging server provides meeting invitations to the respective designated meeting participants, and subsequently convenes the on-line meeting between the user of the mobile telephone and those designated meeting participants who accept the invitation to join the on-line meeting.

In an alternative configuration, the mobile telephone may not be operative to transmit and receive SMS messages. In this case, the user of the mobile telephone may log onto the instant messaging server by providing at least one voice or keypad (DTMF) input to the telephone interface of the real-time messaging server, which subsequently provides appropriate messages to the instant messaging server for logging that user onto the IM system. For example, the telephone interface may include a voice recognition sub-system operative to receive voice input from the mobile telephone, and to transmit voice prompts to the mobile telephone. The user of the mobile telephone provides, via voice or DTMF inputs, the names of the desired meeting participants and an optional indication of the topic of the meeting to the real-time messaging server, which convenes the on-line meeting between the user of the mobile telephone and those designated meeting participants who accept invitations to join the on-line meeting.

In the event at least some of the desired meeting participants are unavailable, the real-time messaging server can provide the user of the mobile telephone with a choice of (1) waiting until all of the desired meeting participants are on-line and available, (2) proceeding with the convening of the on-line meeting between the user of the mobile telephone and only the desired meeting participants who are currently on-line and available, or (3) withdrawing his or her request for the on-line meeting. In one embodiment, in the event one or more of the designated meeting participants are unavailable, the real-time messaging server provides the user of the mobile telephone with one or more names of suggested stand-ins for the unavailable users. The user of the mobile telephone can indicate his or her selection among the various choices provided by the real-time messaging server by transmitting at least one SMS message, or by providing at least one voice or DTMF input, to the real-time messaging server.

In still another configuration, the mobile telephone may provide data connectivity, and may have specialized application software (including instant messaging (IM) application software) loaded thereon and logged onto the instant messaging server. Such specialized application software may allow the user of the mobile telephone to generate a "buddy list", and may provide a representation of the buddy list on a display of the mobile telephone. The representation of the buddy list on the telephone display may include an indication of the on-line presence and availability status of each user on the buddy list. The specialized application software may also allow the user of the mobile telephone to indicate one or more desired on-line meeting participants by selecting them from the list on the telephone display using a telephone keypad or any other suitable input device such as a stylus, to input the topic of the on-line meeting via the keypad, and to request the on-line meeting with the designated meeting participants by selecting a command from a menu via the keypad, thereby providing the names of the designated meeting participants and optionally the topic of the meeting to the real-time messaging server. Next, in conjunction with the instant messaging server, the real-time messaging server may determine the on-line presence and availability status of each of the designated meeting participants, and may either convene the on-line meeting or provide a number of choices of action to the mobile telephone user, as described above.

In another mode of operation, the mobile telephone is operative to receive an invitation from the real-time messaging server to join an on-line meeting or teleconference with at least one other user of a mobile or non-mobile device. As in the first mode of operation described above, several configurations of the mobile telephone are possible. In one configuration, the mobile telephone is operative to exchange voice messages and short message service (SMS) messages with the real-time messaging server, and to exchange SMS messages with the instant messaging server. For example, the mobile telephone may be enabled for SMS forwarding, thereby allowing the mobile telephone to receive the meeting invitation from the real-time messaging server via at least one SMS message. In the event the mobile telephone network is configured to provide an indication of the presence of the mobile telephone on the network to the real-time messaging server, the real-time messaging server can employ this information to determine the on-line presence of the user of the mobile telephone before transmitting the meeting invitation to that user. Otherwise, the real-time messaging server effectively assumes that the user of the mobile telephone is present and on-line, so long as the mobile telephone is configured to receive messages from the real-time messaging server. For example, the mobile telephone may be SMS-enabled, or may be configured to maintain a data connection to the real-time messaging server. In addition, the user of the mobile telephone can change his or her availability status by transmitting at least one SMS message or "short code" to the real-time messaging server. The real-time messaging server provides the meeting invitation to the user of the mobile telephone via at least one SMS message, which includes the name of the user requesting the on-line meeting and an optional indication of the topic of the meeting. The mobile telephone user can accept the invitation to join the on-line meeting by transmitting at least one SMS message to the real-time messaging server, after which the real-time messaging server may convene the on-line meeting between the mobile telephone user and the other meeting participant(s). Alternatively, the meeting invitation may include a telephone number associated with the telephone interface of the real-time messaging server, and the user of the mobile telephone may accept the invitation to join the on-line meeting by "dialing" the telephone number and by providing at least one voice or DTMF input to the real-time messaging server. If the mobile telephone and the other mobile and/or non-mobile devices participating in the on-line meeting have application software loaded thereon that provides voice over Internet protocol (VoIP) functionality, then the real-time messaging server may convene a voice conference between the users of the respective mobile and/or non-mobile devices.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIGS. 4a-4d are illustrative user interfaces that may be employed by a user of the mobile client of FIG. 1 for requesting an on-line meeting or teleconference with one or more users of the other client sub-systems of FIG. 1;

FIGS. 5a-5b are illustrative user interfaces that may be employed by a user of the mobile client of FIG. 1 for accepting an invitation to and for participating in an on-line meeting or teleconference with one or more users of the other client sub-systems of FIG. 1.

DETAILED DESCRIPTION OF THE INVENTION

The entire disclosure of U.S. Provisional Patent Application No. 60/672,756 filed Apr. 19, 2005 entitled PRESENCE-ENABLED MOBILE ACCESS is incorporated herein by reference.

A real-time communications system is disclosed that can convene an on-line meeting or teleconference involving text, audio, video, and/or data between multiple users of mobile and/or non-mobile devices based at least in part on the on-line presence and availability status of the respective users of the mobile and/or non-mobile devices.

Figure 1:
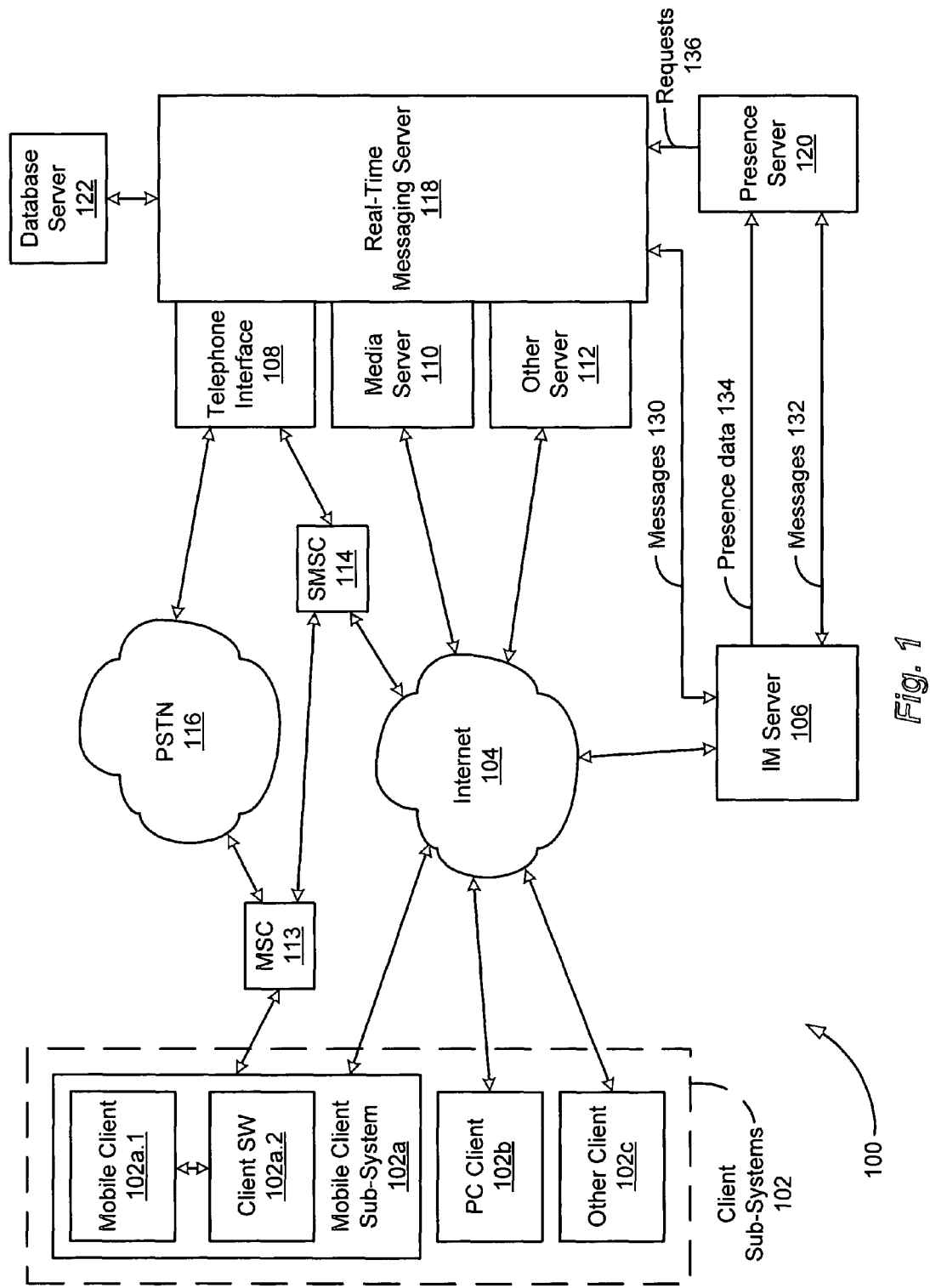
FIG. 1 is a block diagram illustrating a real-time communications system according to the present invention, in which a number of client sub-systems including at least one mobile client and a real-time messaging server are interconnected via at least one communications network.

FIG. 1 depicts an illustrative embodiment of a real-time communications system 100, in accordance with the present invention. In the illustrated embodiment, the real-time communications system 100 includes a plurality of client sub-systems 102, at least one real-time messaging server computer 118, a telephone interface 108, at least one mobile switching center (MSC) 113, at least one short message service center (SMSC) 114, a plurality of server computers including an instant messaging server 106, a media server 110, a presence server 120, and a database server 122, and a plurality of communications networks including the Internet 104 and the public switched telephone network (PSTN) 116. As shown in FIG. 1, the plurality of client sub-systems 102 includes a mobile client sub-system 102a including a mobile client computer 102a.1 and client software 102a.2, a PC client sub-system 102b, and any other suitable client sub-system 102c such as a sub-system running Macromedia Flash Player™ application software (a "Flash client"), a Java™ virtual machine, a browser client sub-system, or a web services client sub-system. It is noted that the real-time communications system 100 may further include any other suitable server computer 112 such as a web server or a telephony server. Each of the client sub-systems 102 and the servers 106, 110, 112 are communicably coupleable to the Internet 104. The client sub-system 102a, namely, the mobile client sub-system 102a, is also communicably coupleable to the PSTN 116 via the MSC 113, and to the telephone interface 108 via the MSC 113 and the SMSC 114.

In the presently disclosed embodiment, the MSC 113 is configured to route telephone calls including voice and other information that can be carried over a voice channel such as dual tone multi-frequency (DTMF) signaling between the mobile client 102a.1 and the PSTN 116, as known in the art. It is understood that the MSC 113 is connected to at least one base station sub-system operative to provide wireless signaling over a mobile telephone network to and from the mobile client 102a.1, as known in the art. The MSC 113 is also configured to route SMS messages between the mobile client 102a.1 and the SMSC 114, as known in the art. The mobile client 102a.1 is therefore operative to communicate with the real-time messaging server 118 either over the PSTN 116 or via the SMSC 114 through the telephone interface 108. The PC client sub-system 102b is operative to communicate with the real-time messaging server 118 over the Internet 104 through the media server 110, which may comprise a Flash™ media server or any other suitable media server. In one embodiment, the mobile client 102a.1 is configured to provide data connectivity, and may communicate with the real-time messaging server 118 over the Internet 104 through the media server 110. For example, the mobile client 102a.1 may comprise a mobile telephone, a personal digital assistant (PDA), a laptop computer, or any other suitable mobile or portable device.

It is understood that each of the client sub-systems 102, the MSC 113, the SMSC 114, the telephone interface 108, and the server sub-systems 106, 110, 112, 118, 120, and 122 may be embodied as one computer system or as separate sub-systems, each including one or more processors, program code memory, one or more secondary program code storage devices, a number of input/output interface devices, and operating system and application software, as configured for a given operational environment. It is noted that the client subsystems 102 are not required to execute specialized, dedicated client-side application software to access the features provided by the real-time communications system 100. Instead, messages and content used to access the system features may be loaded and processed within the client subsystems 102, as needed, using known client-side application software such as Flash™ or Java™ application software. In addition, the servers 106, 110, and 112 may employ known protocols such as the real-time messaging protocol (RTMP) for interfacing to the client sub-systems 102.

In the disclosed exemplary embodiment, the real-time communications system 100 provides real-time messaging functionality between the users of the client sub-systems 102 based on a plurality of rules and a rules engine implemented within the real-time messaging server 118. The real-time communications system 100 is operative to provide such real-time messaging functionality in response to a number of monitored conditions such as the on-line presence and availability status of the respective users of the mobile and non-mobile client sub-systems 102 and the detection of one or more predetermined events. Such real-time messaging facilitates rapid initiation of on-line meeting or teleconference convocation by contacting the users required for the on-line meeting based on dynamically determined group memberships, at least in part as a function of which users are currently present and available to participate in the meeting.

In addition, the real-time communications system 100 allows stand-ins to be substituted for members of participant groups of users that are determined to be unavailable. Such user stand-ins may be automatically selected based on matches between their roles, expertise, and/or preferences relative to the requirements of a specific on-line meeting or teleconference. Stand-ins may also be automatically selected based on stand-in designations made by individual users, as represented by data stored on the real-time messaging server 118. For example, the disclosed system 100 may provide for selective stand-in designations as a function of the topic of a given on-line meeting or teleconference. The disclosed system 100 may also provide for transitivity of stand-in designations between users or groups of users, resulting in an increased ability to provide a given inquiry quickly to the most appropriate user. In one embodiment, the real-time communications system 100 allows users to make express invitations to stand-ins, and/or to make express selections of stand-ins. Such stand-in invitations and/or selections may be made via a dialog box within a graphical user interface (GUI) of the respective client sub-system 102. For example, the dialog box may list the individuals included in a particular meeting invitation, and may allow a user to invite only those listed individuals who are currently available, to invite all of the listed individuals whether or not they are currently available, or to select stand-ins for the listed individuals who are currently unavailable.

In addition, the real-time communications system 100 provides a number of features relating to user groups. For example, the disclosed system 100 permits group definitions to be shared among multiple users. Further, temporary membership in a particular group may be enabled to grant temporary access to data and/or specific functions associated with that group. Moreover, to determine the most appropriate users for a particular group or the most appropriate stand-in for a particular user, the disclosed system 100 may provide data mining capabilities for relevant skills assessment, e.g., by identifying one or more users who recently published a document on a given topic or who responded to a message relating to a given topic. Such features of the real-time communications system 100 relating to real-time messaging, stand-ins, and user groups are further described in co-pending U.S. patent application Ser. No. 10/731,872 filed Dec. 9, 2003 entitled RULES BASED REAL-TIME COMMUNICATION SYSTEM, the entire disclosure of which is incorporated herein by reference.

Figure 2:
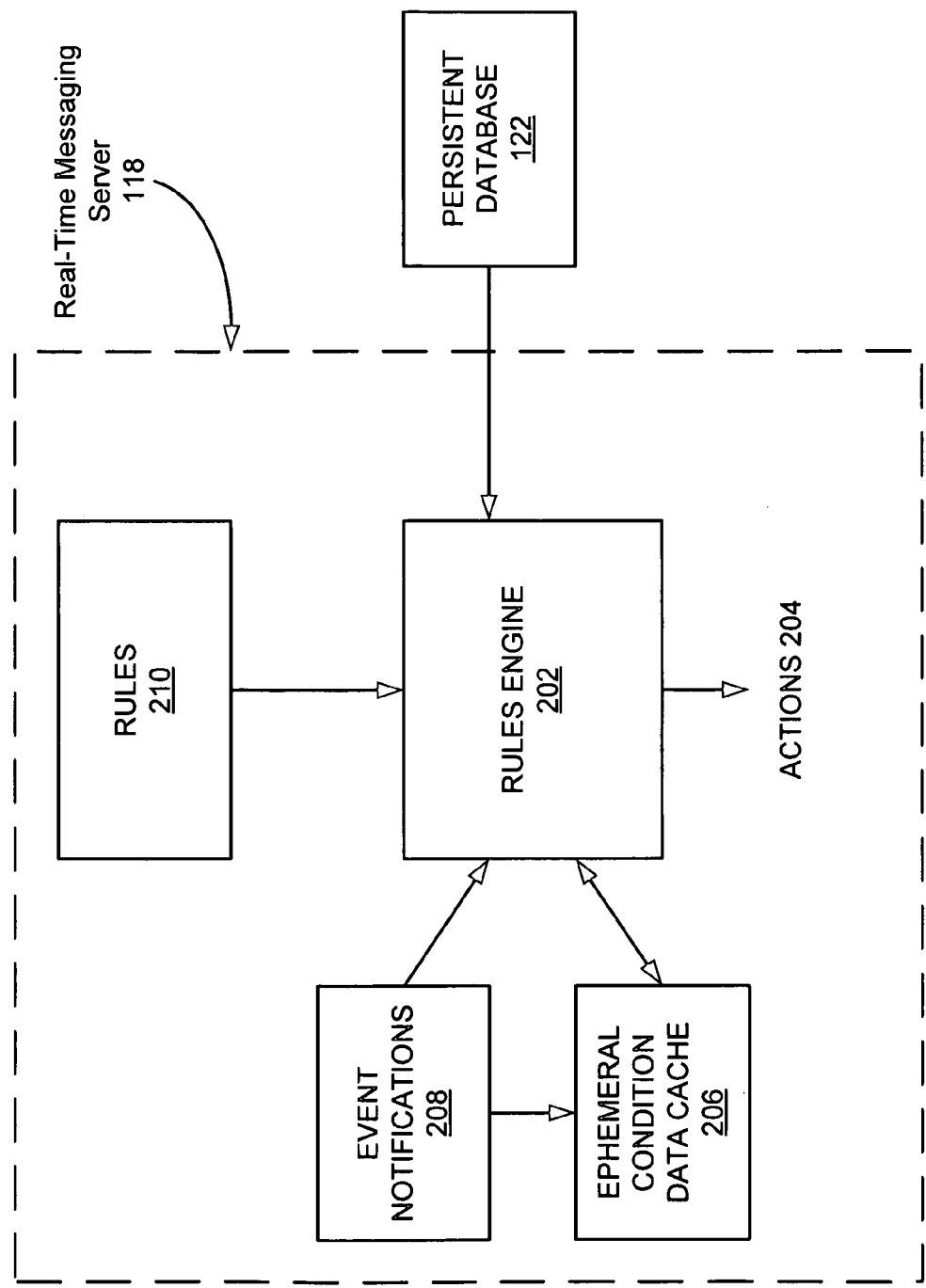
FIG. 2 is a block diagram illustrating the real-time messaging server of FIG. 1.

FIG. 2 depicts an illustrative software configuration of the real-time messaging server 118 (see also FIG. 1). In the illustrated embodiment, the software configuration includes a rules engine 202 operative to process a plurality of rule definitions 210. The rules engine 202 is responsive to event notifications 208 and the contents of an ephemeral condition data cache 206. The rules engine 202 is further responsive to the contents of the persistent database 122, which may, for example, be stored on a separate database server system (see, e.g., FIG. 1). In an alternative embodiment, the rules 210 may be provided within the rules engine 202 itself. The ephemeral condition data cache 206 includes presence indications for multiple users of the disclosed system 100. Such presence indications reflect the instantaneous on-line presence of the system users. It is understood that the ephemeral condition data cache 206 may be implemented on a separate data storage server system such as the presence server 120 (see FIG. 1). The persistent database 122 is operative to store configuration data reflecting user preferences and user group definitions. For example, such configuration data may include data relating to stand-in definitions, availability filters, and/or contact lists of the various system users. The rules 210 define a plurality of actions 204 that are performed in response to the event notifications 208, information provided by the ephemeral condition data cache 206, and/or information provided by the persistent database 122. The rules 210 are processed by the rules engine 202, which may be implemented using any suitable programming language. For example, the actions 204 performed by the rules engine 202 may include actions facilitating real-time group activities such as convening an on-line meeting or teleconference, sending e-mail or instant messages to one or more system users, and/or routing a document. The various actions 204 may range from simple to complex actions, and may include multi-stage actions that are performed in several distinct steps, depending at least in part upon the receipt of separate event notifications and the state of conditions stored in the ephemeral condition data cache 206 over time.

Figure 3:
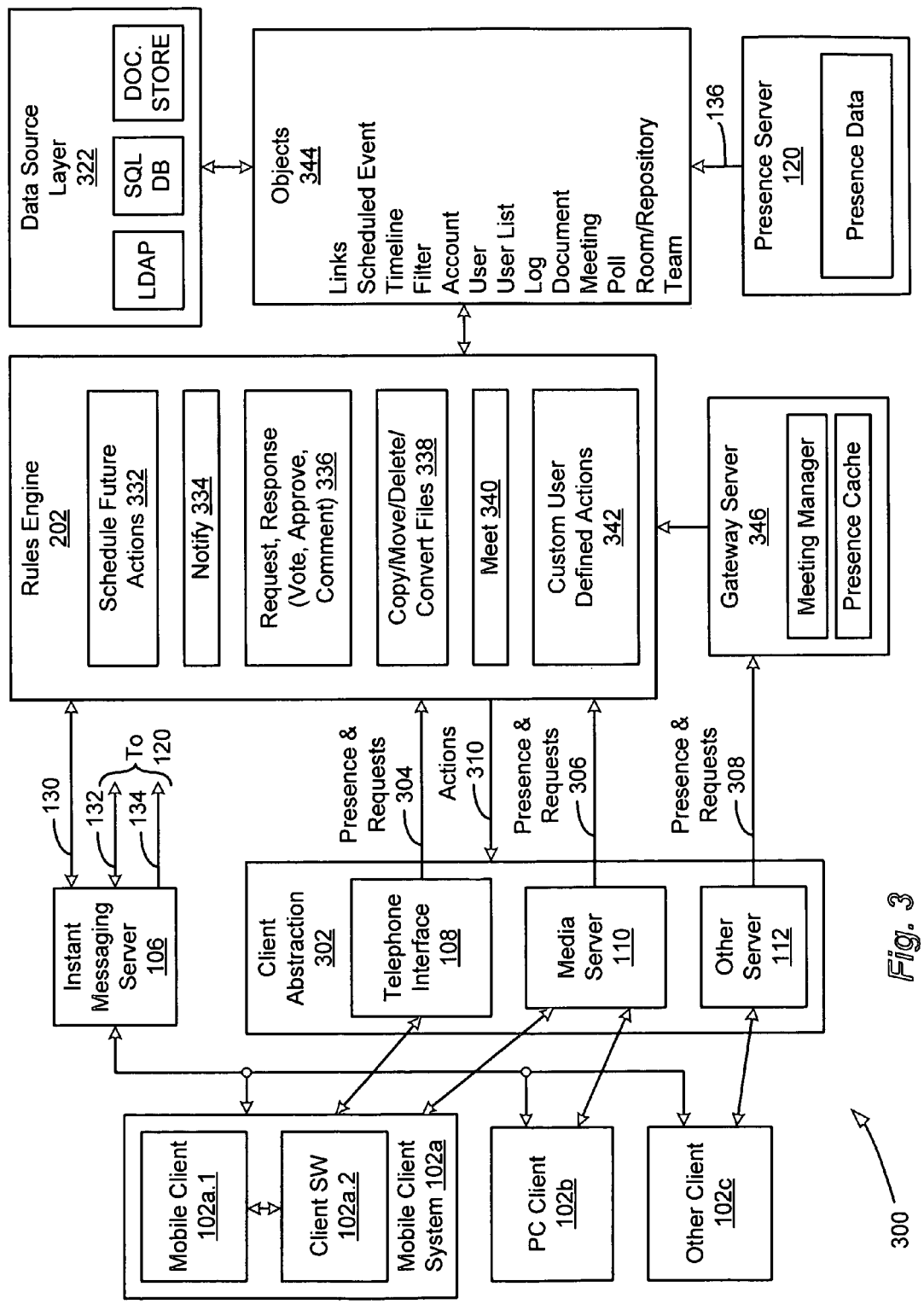
FIG. 3 is a block diagram illustrating the structure and operation of the real-time communications system of FIG. 1.

FIG. 3 depicts an illustrative embodiment of an architecture 300 of the real-time communications system 100 (see FIG. 1), including a representation of the rules engine 202 (see also FIG. 2). In the illustrated embodiment, the rules engine 202 includes a plurality of functional units, each of which is operative to perform one or more real-time communications activities. In one embodiment, the plurality of functional units includes a schedule future actions unit 332 for scheduling actions to be performed at later points in time, a notify unit 334 for performing notification actions, a request, response (vote, approve, comment) unit 336 supporting certain types of request and response actions relating to voting, approval, and commenting, a copy/move/delete/convert files unit 338 supporting file operations performed by the rules engine 202, a meet unit 340 for convening on-line meetings and teleconferences, and a custom user defined actions unit 342. It should be noted that the specific functional units included in the rules engine 202 are described herein for purposes of illustration only, and that any other suitable functional units may be included within the rules engine 202 for a given embodiment. The various functional units included in the rules engine 202 define the processing performed by the rules engine 202, and reflect the specific set of rules loaded into the rules engine 202.

As shown in FIG. 3, the rules engine 202 interfaces to a data source layer 322 through a number of object definitions 344, which provide a predetermined interface to data sources such as an SQL database and a document storage database. It is understood that the data sources accessed via the data source layer 322 may be configured to store event data, ephemeral data, and/or persistent data. As described above, the disclosed system 100 may provide data mining capabilities. To that end, the data source layer 322 can be configured to implement any suitable directory access protocol such as the lightweight directory access protocol (LDAP), which is a known Internet protocol that e-mail and other software programs may employ to look up information stored on a server. It is noted that, in addition to relational databases provided in the system for storing its own information, the data source layer 322 may also include external sources of data such as a corporate directory.

Within the system architecture 300, communications between the client sub-systems 102a, 102b, 102c and the rules engine 202 are performed through a client abstraction layer 302, which includes the telephone interface 108, the media server 110, and any other suitable server 112 (see also FIG. 1). As shown in FIG. 3, the rules engine 202 is operative to receive and process presence information and meeting request messages 304, 306, and 308. Specifically, if the mobile telephone network is configured to provide an indication of whether the mobile client 102a.1 is powered-on and within the coverage area of the network, then such information can be included in the presence information 304, which is passed directly from the telephone interface 108 to the rules engine 202. In one embodiment, the presence information and meeting requests 306 originating from the PC client sub-system 102b may be passed directly from the media server 110 to the rules engine 202. Further, the presence information and meeting requests 308 originating from the client sub-system 102c such as a web services client may be passed to the rules engine 202 via a gateway server 346, which may include a meeting manager and a presence data cache. In an alternative embodiment, if one or more of the client sub-systems 102a, 102b, 102c have instant messaging (IM) application software loaded thereon and logged onto the IM system, then the instant messaging server 106 may provide presence data 134 (see also FIG. 1) relating to one or more of the client sub-systems 102a, 102b, 102c to the rules engine 202 via the presence server 120.

The presence data 134, 304, 306, 308 are indicative of the on-line presence of one or more users operating one or more of the respective client sub-systems 102. Moreover, the meeting requests 304, 306, 308 include requests to convene real-time group activities such as on-line meetings or teleconferences, and/or requests to transmit messages between the various users of the client sub-systems 102a, 102b, 102c. In the event one or more of the client sub-systems 102a, 102b, 102c have IM application software loaded thereon and logged onto the IM system, the client sub-systems 102a, 102b, 102c may provide such meeting requests to the instant messaging server 106, which may subsequently process the meeting requests in conjunction with the real-time messaging server 118. After processing the presence information and meeting requests 304, 306, 308, the rules engine 202 issues the appropriate actions 310 back to the client sub-systems 102a, 102b, 102c via the client abstraction 302. As described above, such actions may include real-time group actions relating to the convening of an on-line meeting or teleconference, and/or the passing of messages between the system users.

In the presently disclosed embodiment, at least the mobile client sub-system 102a incorporates client software such as the client software 102a.2 (see FIGS. 1 and 3), which may comprise any suitable client-side application software including instant messaging (IM) application software such as AIM™ (AmericaOnline™ Instant Messenger) application software. As described above, the mobile client 102a.1 may comprise a mobile telephone. In one embodiment, the mobile telephone 102a.1 is configured to provide data connectivity, and has IM application software loaded thereon and logged onto the instant messaging server 106. In such a configuration, the mobile telephone 102a.1 may communicate with the real-time messaging server 118 via the instant messaging server 106. Alternatively, the mobile telephone 102a.1 may communicate with the real-time messaging server 118 over the PSTN 116 via the telephone interface 108, which is configured to maintain a connection to the PSTN 116 for transmitting voice prompts to the mobile telephone 102a.1, and for receiving voice and/or dual tone multi-frequency (DTMF) inputs from the mobile telephone 102a.1.

The real-time communications system 100 (see FIG. 1) is operative to convene an on-line meeting or teleconference involving text, audio, video, and/or data between the users of the mobile telephone 102a.1, the PC client sub-system 102b, and any other suitable mobile or non-mobile client sub-system 102c, based at least in part on the on-line presence and availability status of the respective users of the mobile and non-mobile devices. In the event the mobile telephone network can provide an indication of whether the mobile telephone 102a.1 is powered-on and within the coverage area of the network, the real-time messaging server 118 may access this information to determine the on-line presence of the mobile telephone 102a.1. Otherwise, the real-time messaging server 118 effectively assumes that the user of the mobile telephone 102a.1 is present and on-line, so long as the mobile telephone 102a.1 is configured to receive messages from the real-time messaging server 118. For example, the mobile telephone 102a.1 may be enabled for SMS forwarding. Specifically, the user of the mobile telephone 102a.1 may employ instant messaging (IM) application software on his or her personal computer to forward (or cause to be forwarded) instant messages intended for receipt at the personal computer to the mobile telephone 102a.1. For example, the IM application software on the personal computer may be operative to receive instant messages, and to forward the instant messages to the mobile telephone 102a.1 as SMS messages. Alternatively, the IM application software on the personal computer may be operative to instruct the instant messaging server 106 to forward instant messages to the mobile telephone 102a.1 as SMS messages, e.g., in the event the user is not currently present at the personal computer. In an alternative configuration, the mobile telephone 102a.1 may maintain a data connection to the instant messaging server 106 and/or the real-time messaging server 118. Based on whether the mobile telephone 102a.1 is determined to be present or assumed to be present, the real-time messaging server 118 may transmit an invitation to the user of the mobile telephone 102a.1 to join an on-line meeting with one or more of the users of the client sub-systems 102b, 102c. In response to the meeting invitation, the user of the mobile telephone 102a.1 may accept the invitation to join the on-line meeting via at least one message transmitted to the instant messaging server 106 or the real-time messaging server 118, which may subsequently convene the on-line meeting between the user of the mobile telephone 102a.1 and the users of the client sub-systems 102b, 102c.

The presently disclosed real-time communications system 100 for convening an on-line meeting or teleconference between multiple users of mobile and/or non-mobile devices will be better understood with reference to the following illustrative examples and FIGS. 1, 4a-4d, and 5a-5b. In a first illustrative example, a request for an on-line meeting originates from the user of the mobile client 102a.1, which is a mobile telephone. The on-line meeting may comprise an instant messaging (IM) session between the user of the mobile telephone 102a.1 and at least one of the users of the client sub-systems 102b, 102c. In this first example, several configurations of the mobile telephone 102a.1 are possible, based at least in part on the client software 102a.2 loaded onto the mobile telephone 102a.1.

In one configuration, the mobile telephone 102a.1 is operative to exchange voice messages and short message service (SMS) messages with the real-time messaging server 118, and to exchange SMS messages with the instant messaging server 106. To request the IM session with the users of the client sub-systems 102b, 102c, the user of the mobile telephone 102a.1 logs onto the instant messaging server 106 by transmitting at least one specified SMS message such as an SMS "short code" to the instant messaging server 106. Next, using an alphanumeric keypad 402 and display 404 included in the mobile telephone 102a.1, the mobile telephone user inputs the names of the desired meeting participants (e.g., the name of the user of the client sub-system 102b ("User b") and the name of the user of the client sub-system 102c ("User c"); see FIG. 4a), optionally inputs the topic of the instant messaging (IM) session (e.g., "Project status"; see FIG. 4a), and transmits the on-line meeting request including the names of the desired meeting participants and optionally the topic of the IM session to the real-time messaging server 118 via at least one SMS message. In one embodiment, if the mobile telephone 102a.1 has instant messaging application software loaded thereon, then the user of the mobile telephone 102a.1 may transmit the request for the on-line meeting by selecting a command from a menu 406 via the keypad 402 (e.g., "Request, Transmit"; see FIG. 4a). The real-time messaging server 118 then determines, in conjunction with the instant messaging server 106, whether the designated meeting participants are on-line and available. In the event the designated meeting participants are on-line and available to participate in the IM session, the real-time messaging server 118 provides meeting invitations to the respective designated meeting participants, and subsequently convenes the IM session between the user of the mobile telephone 102a.1 and the users of the client sub-systems 102b, 102c who accept the invitations to join the IM session. For example, if one or both of the client sub-systems 102b, 102c comprise non-mobile devices such as personal computers, then such meeting invitations may be provided to the users of the client sub-systems 102b, 102c via a dialog box within a graphical user interface (GUI) of the respective personal computer. Alternatively, if one or both of the client sub-systems 102b, 102c comprise mobile devices such as mobile telephones, then such meeting invitations may be provided to the users of the client sub-systems 102b, 102c via at least one SMS message displayable on the respective mobile telephone. Otherwise, the real-time messaging server 118 transmits at least one SMS message to the mobile telephone 102a.1 indicating that at least one of the desired meeting participants is currently unavailable (e.g., "User b is unavailable"; see FIG. 4b), and indicating a number of choices of subsequent user action.

Specifically, via at least one SMS message, the real-time messaging server 118 can provide the user of the mobile telephone 102a.1 with a choice of (1) waiting until the desired meeting participants User b and User c are on-line and available (e.g., "WAIT UNTIL AVAILABLE? Y/N"; See FIG. 4b), (2) proceeding with the on-line meeting, i.e., the IM session, between the mobile telephone user and only User b or c who is currently on-line and available (e.g., "PROCEED? Y/N"; see FIG. 4b), or (3) withdrawing his or her request for the on-line meeting (e.g., "WITHDRAW MEETING REQUEST? Y/N"; see FIG. 4b). In one embodiment, the real-time messaging server 118 provides the user of the mobile telephone 102a.1 with one or more names of suggested stand-ins for the unavailable user(s). The user of the mobile telephone 102a.1 can indicate his or her selection among the various choices provided by the real-time messaging server 118 via at least one SMS message transmitted to the server 118. In an alternative embodiment, if User b and/or User c are currently unavailable, then the instant messaging server 106 may automatically transmit one or more messages 130 to the real-time messaging server 118, instructing the server 118 to wait until at least one of the Users b, c is on-line and available before convening the IM session. In still another embodiment, a proxy server (not shown) may intercept the message from the real-time messaging server 118 to the mobile telephone 102a.1 indicating that User b and/or User c are currently unavailable, and may automatically transmit at least one message to the real-time messaging server 118, instructing the server 118 to wait until User b and/or User c are on-line and available before convening the IM session.

In this first illustrative example, when the real-time messaging server 118 receives instructions to wait until at least one of the Users b, c is on-line and available before convening the IM session, the real-time messaging server 118 transmits one or more messages 130 to the instant messaging server 106, instructing the server 106 to notify the presence server 120, via one or more messages 132, of any detected changes in the on-line presence of the Users b, c. For example, if the client sub-systems 102b, 102c comprise personal computers, then the instant messaging server 106 may detect changes in the on-line presence of the respective client sub-systems 102b, 102c by determining whether the sub-systems 102b, 102c are logged onto the instant messaging server 106. The instant messaging server 106 also provides indications of the current on-line presence state of the respective Users b, c to the presence server 120 via the presence data 134. In an alternative embodiment, the instant messaging server 106 may automatically provide updates of the on-line presence of each of the users of the real-time communications system 100 to the presence server 120, which automatically tracks, e.g., via filtering, the presence of the respective users with reference to one or more pending meeting requests.

Specifically, the presence server 120 maintains a record of the instruction to wait until at least one of the Users b, c is on-line and available, and a copy of the on-line presence state of each of the Users b, c. When the instant messaging server 106 detects a change in the on-line presence of User b and/or User c and subsequently provides updated presence data 134 to the presence server 120, the presence server 120 updates its local copy of that user's on-line presence state, and determines whether the conditions for convening the IM session are now satisfied, i.e., whether or not User b and/or User c are on-line and available to participate in the IM session. If the conditions for the IM session are satisfied, then the presence server 120 sends at least one request 136 to the real-time messaging server 118 to convene the IM session between the user of the mobile telephone and the designated users of the client sub-systems 102b, 102c (i.e., User b, User c).

It is noted that when the user of the mobile telephone 102a.1 (or User b, User c) logs onto the instant messaging server 106 or changes his or her availability status to "available", there may already be a meeting request pending in the system and waiting for that user to become available. In this case, upon changing his or her availability status to available, the user would immediately receive an invitation to join the on-line meeting.

In response to the request from the presence server 120 to convene the IM session, the real-time messaging server 118 transmits at least one SMS message to the mobile telephone 102a.1, informing the user of the mobile telephone 102a.1 that User b and/or User c are now available to participate in the IM session (e.g., "User b is now available"; see FIG. 4c), and instructing the user of the mobile telephone 102a.1, via at least one message displayed on his or her telephone, to re-transmit the request for the IM session with the users of the client sub-systems 102b, 102c (e.g., "RE-TRANSMIT MEETING REQUEST"; see FIG. 4c). As described above, such a meeting request includes the names of the desired meeting participants, and optionally the topic of the IM session. In the event the mobile telephone user still wishes to participate in an IM session with Users b, c, he or she re-transmits the request for the IM session to the real-time messaging server 118 via at least one SMS message. Because the designated meeting participants have been determined to be on-line and available, the real-time messaging server 118, upon receipt of the re-transmitted meeting request and in conjunction with the instant messaging server 106, convenes the IM session between the user of the mobile telephone 102a.1 and the users of the client sub-systems 102b, 102c (i.e., User b and/or User c). It is understood that if User b and/or User c become unavailable between the time the instruction to re-transmit the meeting request is received at the mobile telephone 102a.1, and the time the meeting request is actually re-transmitted to the real-time messaging server 118, then the real-time messaging server 118 may again provide the user of the mobile telephone 102a.1 with a number of choices of subsequent user action, including waiting until User b and/or User c are on-line and available to participate in the on-line meeting, as described above.

In an alternative embodiment, instead of transmitting an instruction to the user of the mobile telephone 102a.1 to re-transmit the request for the IM session, the real-time messaging server 118 may transmit one or more messages 130 directly to the instant messaging server 106, instructing the instant messaging server 106 (1) to notify the mobile telephone user, via at least one SMS message, that the desired meeting participants are now on-line and available, (2) to wait for the mobile telephone user's response, and, (3) as appropriate, to convene the IM session between the users of the client sub-systems 102a, 102b, and/or 102c. In still another embodiment, the real-time messaging server 118 may transmit at least one message to a proxy server (not shown), instructing the proxy server to perform the actions of notifying the user of the mobile telephone 102a.1 when the desired meeting participants are on-line and available, waiting for the mobile telephone user's response, and, as appropriate, transmitting a request to the instant messaging server 106 to convene the IM session between the respective users.

In an alternative configuration, the mobile telephone 102a.1 may not be enabled to exchange SMS messages with either the instant messaging server 106 or the real-time messaging server 118. In this case, the user of the mobile telephone 102a.1 may log onto the instant messaging server 106 by providing at least one voice or keypad (DTMF) input to the telephone interface 108 of the real-time messaging server 118, which subsequently provides appropriate messages to the instant messaging server 106 for logging that user onto the IM system. For example, the telephone interface 108 may include a voice recognition sub-system operative to receive voice input from the mobile telephone 102a.1, and to transmit voice prompts to the mobile telephone 102a.1. The user of the mobile telephone 102a.1 provides, via voice or DTMF inputs, the names of the desired meeting participants (e.g., User b and/or User c), and an optional indication of the topic of the on-line meeting (e.g., Project status), to the real-time messaging server 118, which convenes the on-line meeting between the user of the mobile telephone 102a.1 and those designated meeting participants (i.e., User b and/or User c) who accept invitations to join the meeting.

In still another configuration, the mobile telephone 102a.1 may provide data connectivity, and may have specialized application software (including instant messaging (IM) application software) loaded thereon, thereby allowing the user of the mobile telephone 102a.1 to log on directly to the instant messaging server 106 over the Internet 104. Such specialized application software may allow the user of the mobile telephone 102a.1 to generate a "buddy list", and may allow a representation of the buddy list to be displayed on the telephone display 404. For example, the representation of the buddy list on the mobile telephone display may include indications of the on-line presence and availability status of each user on the list (e.g., John (on-line and available), Mary (on-line and busy), User b (off-line), and User c (on-line and available); see FIG. 4d). The specialized application software may also allow the user of the mobile telephone 102a.1 to select one or more desired meeting participants from the displayed listing via the telephone keypad 402 (e.g., "User c (on-line and available)"; see FIG. 4d), to input the topic of the on-line meeting via the keypad 402 (e.g., "Project status"; see FIG. 4d), and to request the on-line meeting with the designated meeting participants by selecting a command from the menu 406 via the keypad 402 (e.g., Request, Transmit; see FIG. 4a), thereby providing the names of the designated meeting participants (User c), and optionally the topic of the meeting (Project status), to the real-time messaging server 118. Next, in conjunction with the instant messaging server 106, the real-time messaging server 118 may determine the on-line presence and availability status of each designated meeting participant, and may either convene the on-line meeting or provide a number of choices of subsequent user action, as described above.

In a second illustrative example, the mobile telephone 102a.1 is operative to receive an invitation from the real-time messaging server 118 to join an on-line meeting or teleconference, for example, an instant messaging (IM) session, with one or both of the users of the client sub-systems 102b, 102c. As in the first illustrative example described above, several configurations of the mobile telephone 102a.1 are again possible, based at least in part on the client software 102a.2 loaded onto the mobile telephone 102a.1.

In one configuration, the mobile telephone 102a.1 is operative to exchange voice messages and short message service (SMS) messages with the real-time messaging server 118, and to exchange SMS messages with the instant messaging server 106. For example, the mobile telephone 102a.1 may be enabled for SMS forwarding, thereby allowing the mobile telephone 102a.1 to receive a meeting invitation from the real-time messaging server 118 via at least one SMS message. In the event the mobile telephone network is configured to provide an indication of the presence of the mobile telephone 102a.1 on the network to the real-time messaging server 118, the real-time messaging server 118 may employ this information to determine the on-line presence of the mobile telephone user before transmitting the meeting invitation to that user. Otherwise, the real-time messaging server 118 effectively assumes that the user of the mobile telephone 102a.1 is present and on-line, so long as the mobile telephone 102a.1 is configured to receive messages from the real-time messaging server 118. For example, the mobile telephone 102a.1 may be SMS-enabled, thereby allowing the real-time messaging server 118 to send SMS messages to the mobile telephone 102a.1 via the SMSC 114. In an alternative embodiment, the mobile telephone 102a.1 may be configured to maintain a data connection to the real-time messaging server 118 for exchanging messages over the Internet 104. In addition, the user of the mobile telephone 102a.1 can change his or her availability status by transmitting at least one SMS message or "short code" to the real-time messaging server 118. In one embodiment, if the mobile telephone user changes his or her availability status in this manner, then he or she is automatically logged onto the instant messaging server 106, even if the user's mobile telephone is not currently enabled for SMS forwarding.

In this second example, the real-time messaging server 118 transmits the meeting invitation (e.g., "Meeting invitation"; see FIG. 5a) to the user of the mobile telephone 102a.1 via at least one SMS message, which includes the name of the user requesting the on-line meeting (e.g., "User c"; see FIG. 5a), and an optional indication of the topic of the on-line meeting (e.g., "Today's schedule"; see FIG. 5a). The mobile telephone user can accept the invitation to join the on-line meeting by transmitting at least one SMS message to the real-time messaging server 118, after which the real-time messaging server 118 may convene the on-line meeting between the user of the mobile telephone 102a.1 and the designated meeting participant(s) (e.g., "User a: Hi Tom. User c: Hi Bill, let's discuss the schedule."; see FIG. 5b). In an alternative embodiment, if the mobile telephone 102a.1 has instant messaging application software loaded thereon, then the mobile telephone user may receive the meeting invitation in the form of a menu that appears on the telephone display, and provides the user with a number of choices including whether to accept or reject the meeting invitation, whether to accept or reject an invitation to join a voice conference, etc. Such instant messaging application software may also provide the user of the mobile telephone 102a.1 with a menu for manually changing his or her availability status. In still another embodiment, the meeting invitation may include a telephone number associated with the telephone interface 108 of the real-time messaging server 118, and the mobile telephone user may accept the invitation to join the on-line meeting by "dialing" the telephone number and by providing at least one voice or DTMF input to the telephone interface 108, which provides an indication of the user's input to the real-time messaging server 118. If the mobile telephone 102a.1, the client sub-system 102b, and/or the client sub-system 102c participating in the on-line meeting have application software loaded thereon that provides voice over Internet protocol (VoIP) functionality, then the real-time messaging server 118 may convene the on-line meeting in the form of a voice conference between the users of the respective client sub-systems.

It is understood that if a user of the PC client 102b requests an on-line meeting or teleconference with one or more of the users of the client sub-systems 102a, 102c, then he or she may employ a buddy list and various menu choices to generate the meeting request, as described above with reference to the user of the mobile telephone 102a.1. It is noted, however, that if the on-line meeting is convened in the form of a voice conference, then the user of the PC client 102b may participate in the voice conference via audio hardware included in the personal computer, so long as the application software loaded onto the computer provides VoIP functionality. Alternatively, the user of the PC client 102b may employ a mobile or non-mobile telephone to participate in the voice conference. The user of the PC client 102b may also receive meeting invitations from one or more of the users of the client sub-systems 102a, 102c, as described above with reference to the user of the mobile telephone 102a.1.

Figure 6:
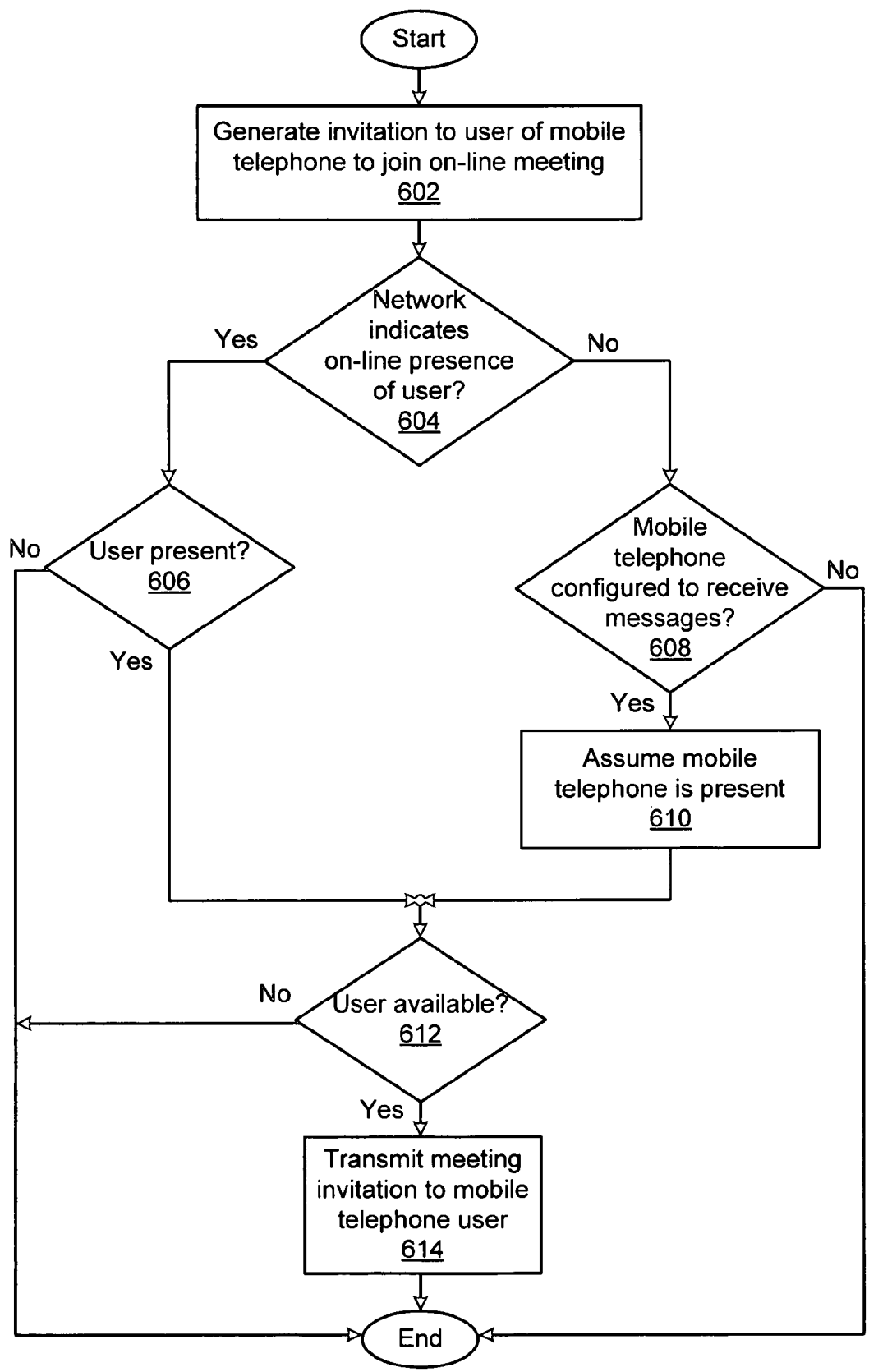
FIG. 6 is a flow diagram depicting an illustrative method of operating the real-time communications system of FIG. 1.

A method of operating the presently disclosed real-time communications system 100 is described below with reference to FIGS. 1 and 6. As depicted in step 602, the real-time messaging server 118 generates an invitation to a user of the mobile telephone 102a.1 to join an on-line meeting. Next, the real-time messaging server 118 makes a determination as to whether the user of the mobile telephone 102a.1 is present to participate in the meeting. Specifically, a determination is made as to whether the mobile telephone network is configured to provide an indication of the on-line presence of the user of the mobile telephone 102a.1, as depicted in step 604. In the event the mobile telephone network is configured to provide an indication of the on-line presence of the mobile telephone user, the real-time messaging server 118 employs such information to determine the on-line presence of the mobile telephone user, as depicted in step 606. Otherwise, a determination is made as to whether the mobile telephone 102a.1 is configured to receive messages from the real-time messaging server 118, as depicted in step 608. For example, the mobile telephone 102a.1 may be enabled for SMS forwarding via the SMSC 114, or may be configured to maintain a data connection to the real-time messaging server 118 over the Internet 104. In the event the mobile telephone 102a.1 is configured to receive messages from the real-time messaging server 118, the real-time messaging server 118 effectively assumes that the user of the mobile telephone 102a.1 is present, as depicted in step 610. In the event the user of the mobile telephone 102a.1 is present, or is assumed to be present, the real-time messaging server 118 makes a determination as to whether the mobile telephone user is available to participate in the on-line meeting, as depicted in step 612. For example, the user of the mobile telephone 102a.1 may have transmitted at least one SMS message to the real-time messaging server 118 indicating his or her on-line presence (e.g., available or busy). As depicted in step 614, in the event the user of the mobile telephone 102a.1 is available, the real-time messaging server 118 transmits the meeting invitation to the mobile telephone user, who subsequently accepts or rejects the invitation to join the on-line meeting.

Having described the above illustrative embodiments, other alternative embodiments or variations may be made. For example, it was described that the real-time messaging server effectively assumes that a user of a mobile device such as a mobile telephone is present and on-line, so long as the mobile device is configured to receive messages from the real-time messaging server. For example, the mobile device may be SMS-enabled, or may be configured to maintain a data connection to the real-time messaging server. In an alternative embodiment, the mobile telephone may automatically and/or periodically transmit one or more messages to the real-time messaging server indicating its current on-line status, thereby obviating the need to make assumptions regarding the on-line status of the mobile telephone. Such messages may be transmitted to the real-time messaging server by the mobile telephone over the Internet, over the PSTN, or via the SMSC, depending on the configuration and functionality of the mobile telephone.

In addition, it should be understood that the various components of the presently disclosed real-time communications system 100 (see FIG. 1) may be owned and operated by different entities. For example, the instant messaging server 106 may be part of the AIM™ instant messaging system, which is independent of the real-time messaging server 118. Further, the real-time messaging server 118 may be capable of transmitting and receiving messages to and from a mobile or non-mobile device via, e.g., the instant messaging server 106, without requiring a direct connection between that device and the real-time messaging server 118. Moreover, the real-time messaging server 118 may be able to employ whatever presence information is contained in or is accessible from the instant messaging server 106. For example, a particular wireless telephone company may choose to share mobile device presence information exclusively with the AIM™ system, and the real-time messaging server 118 may make use of that information by accessing the presence data 134 from the instant messaging server 106.

It will be appreciated by those of ordinary skill in the art that further modifications to and variations of the above-described system and method of providing presence-enabled mobile access may be made without departing from the inventive concepts disclosed herein. Accordingly, the invention should not be viewed as limited except as by the scope and spirit of the appended claims.

What is claimed is:

1. A method comprising:
   receiving a request via one or more communications networks for a real-time group action involving a plurality of clients that are communicatively coupled to the one or more communications networks;
   in response to receiving the request, attempting to determine a presence state of one or more of the plurality of clients, the presence state of a given client of the plurality of clients providing at least an on-line status that indicates whether the given client is on-line in the one or more communications networks, wherein the given client is a mobile device;
   in response to determining that the on-line status of the given client is unable to be determined, determining whether the given client is configured to receive a message via the one or more communications networks;
   in response to determining that the given client is configured to receive a message via the one or more communications networks, and in response to not receiving an indication from the one or more communications networks that the given client is on-line, classifying the given client as having an on-line status of on-line;
   determining whether the real-time group action can be performed based at least in part on the on-line status of one or more of the plurality of clients and at least in part on the classifying of the given client as having an on-line status of on-line; and
   in response to determining that the real-time group action can be performed, acting pursuant to the determining that the real-time group action can be performed.

2. The method of claim 1,
   wherein the message includes at least one short message service (SMS) message; and
   wherein the determining whether the given client is configured to receive a message via the one or more communication networks comprises determining whether the mobile device is configured to receive the at least one SMS message via the one or more communications networks.

3. The method of claim 1,
   wherein the message is one of a voice input and a dual tone multi-frequency (DTMF) input;
   wherein the one or more communications networks include a public switched telephone network (PSTN); and
   wherein the determining whether the given client is configured to receive a message via the one or more communications networks comprises determining whether the mobile device is configured to receive the one of a voice input and a DTMF input over the PSTN.

4. The method of claim 1,
   wherein the given client includes a data connection to the one or more communications networks; and
   wherein the determining whether the given client is configured to receive a message via the one or more communications networks comprises determining whether the given client is configured to receive the message over the one or more communications networks via the data connection.

5. The method of claim 4,
   wherein the one or more communications networks include the Internet; and
   wherein the determining whether the given client is configured to receive a message via the one or more communications networks further comprises determining whether the mobile device is configured to receive the message over the Internet via the data connection.

6. The method of claim 1,
   wherein the presence state of the given client further provides an availability status that indicates whether the given client is available for communication in the one or more communications networks; and
   wherein the method further comprises determining the availability status of one or more of the plurality of clients.

7. The method of claim 6, further comprising, in response to determining that at least one of the plurality of clients has an availability status of unavailable, performing one of (1) waiting until one or more of the plurality of clients has an availability status of available, (2) performing the real-time group action with at least one of the plurality of clients that is determined to have an availability status of available, and (3) withdrawing the request for the real-time group action.

8. The method of claim 6, further comprising, in response to determining that at least one of the plurality of clients has an availability status of unavailable, suggesting at least one stand-in client for the at least one of the plurality of clients that has an availability status of unavailable.

9. The method of claim 6, wherein the determining whether the real-time group action can be performed based at least in part on the on-line status of one or more of the plurality of clients and at least in part on the classifying of the given client as having an on-line status of on-line comprises determining whether the real-time group action can be performed based on the on-line status and on the availability status of one or more of the plurality of clients.

10. The method of claim 1, further comprising, in response to determining that the real-time group action can be performed based at least in part on the on-line status of the respective clients, transmitting an invitation to join the real-time group action to one or more of the plurality of clients that has an on-line status of on-line.

11. The method of claim 10, further comprising receiving at least one acceptance of the invitation to join the real-time group action from at least one of the plurality of clients.

12. The method of claim 1, wherein the request for the real-time group action includes at least one name associated with at least one of the plurality of clients.

13. The method of claim 1,
wherein the real-time group action is convening one of an on-line meeting and a teleconference; and
wherein the request for the real-time group action includes a topic of the one of the on-line meeting and the teleconference.

14. The method of claim 1,
wherein the given client is one of a mobile telephone, a personal digital assistant (PDA), and a laptop computer; and
wherein the receiving the request for the real-time group action comprises receiving the request from the given client.

15. A real-time messaging server comprising:
a communicative coupling to one or more communications networks;
a processor; and
a memory capable of storing computer-executable instructions that, if executed by the processor, causes the real-time messaging server to:
responsive to receiving a request for a real-time group action involving a plurality of clients that are communicatively coupled to the one or more communications networks, attempt to determine a presence state of one or more of the plurality of clients, the presence state of a given client of the plurality of clients providing at least an on-line status that indicates whether the given client is on-line in the one or more communications networks, wherein the given client is a mobile device;
in response to determining that the on-line status of the given client is unable to be determined, determine whether the given client is configured to receive a message via the one or more communications networks;
in response to determining that the given client is configured to receive a message via the one or more communications networks, and in response to the real-time messaging server not receiving an indication from the one or more communications networks that the given client is on-line, classify the given client as having an on-line status of on-line;
determine whether the real-time group action can be performed based at least in part on the on-line status of one or more of the plurality of clients and at least in part on classifying of the given client as having an on-line status of on-line; and
in response to determining that the real-time group action can be performed, act pursuant to the determining that the real-time group action can be performed.

16. The real-time messaging server of claim 15, further comprising an instant messaging server.

17. The real-time messaging server of claim 15, wherein the given client is one of a mobile telephone, a personal digital assistant (PDA), and a laptop computer.

18. The real-time messaging server of claim 15, wherein the communicative coupling is configured to receive the request for the real-time group action from the given client.

19. A tangible computer-readable medium having stored thereon non-transitory computer-executable instructions that, in response to execution by a computing device, cause the computing device to perform functions comprising:
responsive to receiving a request for a real-time group action involving a plurality of clients, attempting to determine a presence state of one or more of the plurality of clients, the presence state of a given client of the plurality of clients providing at least an on-line status that indicates whether the given client is present and on-line in one or more communications networks, wherein the given client is a mobile device;
in response to determining that the on-line status of the given client is unable to be determined, determining whether the given client is configured to receive a message via the one or more communications networks;
in response to determining that the given client is configured to receive a message via the one or more communications networks, and in response to the real-time messaging server not receiving an indication from the one or more communications networks that the given client is on-line, classifying the given client as having an on-line status of on-line;
determining whether the real-time group action can be performed based at least in part on the on-line status of one or more of the plurality of clients and at least in part on the classifying of the given client as having an on-line status of on-line; and
in response to determining that the real-time group action can be performed, acting pursuant to the determining that the real-time group action can be performed.

20. A real-time messaging server comprising:
means for receiving a request via one or more communications networks for a real-time group action involving a plurality of clients that are communicatively coupled to the one or more communications networks;
means for attempting to determine a presence state of one or more of the plurality of clients, the presence state of a given client of the plurality of clients providing at least an on-line status that indicates whether the given client is on-line in the one or more communications networks, wherein the given client is a mobile device;
means for determining that the on-line status of the given client is unable to be determined;
means for determining whether the given client is configured to receive a message via the one or more communications networks;
means for classifying the given client as having an on-line status of on-line in response to the real-time messaging server not receiving an indication from the one or more communications networks that the given client is on-line;
means for determining whether the real-time group action can be performed based at least in part on the on-line status of one or more of the plurality of clients and at least in part on the classifying of the given client as having an on-line status of on-line; and
means for acting pursuant to the determining that the real-time group action can be performed.

* * * * *